United States Patent
Ma et al.

(10) Patent No.: US 12,464,460 B2
(45) Date of Patent: Nov. 4, 2025

(54) POWER SAVING METHODS FOR A MOBILE STATION

(71) Applicant: ZTE Corporation, Guangdong (CN)

(72) Inventors: Xiaoying Ma, Guangdong (CN); Mengzhu Chen, Guangdong (CN); Jun Xu, Guangdong (CN); Xuan Ma, Guangdong (CN); Yuzhou Hu, Guangdong (CN); Qiujin Guo, Guangdong (CN); Focai Peng, Guangdong (CN)

(73) Assignee: ZTE Corporation, Shenzhen (CN)

( * ) Notice: Subject to any disclaimer, the term of this patent is extended or adjusted under 35 U.S.C. 154(b) by 492 days.

(21) Appl. No.: 17/877,217

(22) Filed: Jul. 29, 2022

(65) Prior Publication Data

US 2022/0369231 A1    Nov. 17, 2022

Related U.S. Application Data

(63) Continuation of application No. PCT/CN2020/075356, filed on Feb. 14, 2020.

(51) Int. Cl.
*H04W 52/02* (2009.01)
*H04W 76/28* (2018.01)

(52) U.S. Cl.
CPC ....... *H04W 52/0229* (2013.01); *H04W 76/28* (2018.02)

(58) Field of Classification Search
None
See application file for complete search history.

(56) References Cited

U.S. PATENT DOCUMENTS

| | | |
|---|---|---|
| 2019/0223164 A1 | 7/2019 | He et al. |
| 2019/0261405 A1 | 8/2019 | Ang et al. |
| 2019/0297577 A1 | 9/2019 | Lin et al. |
| 2019/0313383 A1 | 10/2019 | Xiong et al. |
| 2021/0314126 A1* | 10/2021 | Bae ........................ H04L 1/1819 |
| 2022/0353809 A1* | 11/2022 | Maleki ................... H04W 76/28 |
| 2023/0134762 A1* | 5/2023 | Koskela ................ H04W 24/08 370/329 |

FOREIGN PATENT DOCUMENTS

| | | |
|---|---|---|
| WO | 2019/139300 A | 7/2019 |
| WO | 2019/214734 A | 11/2019 |
| WO | WO 2020/017874 A1 | 1/2020 |
| WO | WO 2020/197293 A1 | 10/2020 |

(Continued)

OTHER PUBLICATIONS

Supplementary European Search Report, Sep. 29, 2023, pp. 1-15, issued in European Application No. 20891087.7, European Patent Office, The Hague, The Netherlands.

(Continued)

*Primary Examiner* — Gary Lafontant
(74) *Attorney, Agent, or Firm* — Crowell & Moring LLP

(57) ABSTRACT

This disclosure relates to wireless communication methods that reduce power usage in a mobile station caused by monitoring Physical Downlink Control Channel (PDCCH). The mobile station can implement a PDCCH monitoring skipping behavior including skipping the monitoring of the PDCCH for a skipping period.

21 Claims, 7 Drawing Sheets

(56) References Cited

FOREIGN PATENT DOCUMENTS

WO    WO 2020/246858 A1    12/2020
WO    WO 2021/034626 A1    2/2021

OTHER PUBLICATIONS

Indian Office Action, Nov. 2, 2023, pp. 1-6, issued in Indian Patent Application No. 202217050869, Intellectual Property India, New Delhi, India.
Intel Corporation, On PDCCH-based power saving signal, Apr. 8-12, 2019, pp. 1-8, 3GPP TSG-RAN WG1 #96bis, R1-1904317.
HiSilicon Huawei, Other considerations on UE power saving, Nov. 18-22, 2019, pp. 1-8, 3GPP TSG RAN WG1 Meeting #99, R1-1911874.
International Search Report from WO 2021/098053 A1, dated Oct. 12, 2020.
Communication Pursuant to Article 94(3) EPC issued in EP Application No. 20 891 087.7-1206 dated Apr. 29, 2025, (8 pages).
Chinese-language Office Action issued in Chinese Application No. 202310209786.7 dated Apr. 24, 2025, with English translation (22 pages).

\* cited by examiner

1

POWER SAVING METHODS FOR A MOBILE STATION

This application is a continuation application of PCT International Application No. PCT/2020/075356, filed with the China National Intellectual Property Administration, PRC on Feb. 14, 2020, which is herein incorporated by reference in its entirety.

TECHNICAL FIELD

This disclosure is directed generally to methods for power savings in a mobile station.

BACKGROUND

With the development of wireless communication technology, the transmission rate, delay, throughput, reliability and other performance indices of wireless communication system have been greatly improved through the use of high frequency bands, large bandwidths, multi-antenna arrangements, and other technologies. On the other hand, in order to achieve high-performance wireless transmission, terminals, such a mobile stations, need to carry out more complex processing to meet performance requirements, such as monitoring larger control channel bandwidths, and encoding and decoding processing for more complex control information and data information. The power consumption of the mobile stations affects user experience. Therefore, there is a desire to provide power savings solutions for mobile stations within a wireless communication system.

SUMMARY

In one embodiment, a wireless communication method includes a mobile station determining whether to perform a Physical Downlink Control Channel (PDCCH) monitoring skipping according to at least one of an occurrence of a skip triggering event or a predefined information. In response to determining to perform the PDCCH monitoring skipping, the mobile station performs the PDCCH monitoring skipping, which comprises skipping, by the mobile station, monitoring of the PDCCH for a skipping period of a duration of a first number of units.

In another embodiment, another method of communicating between a wireless access node and a mobile station includes determining, by the wireless access node, indication information, according to at least one of a high-layer signaling or a predefined information. The indication information comprises at least one of an indication for a mobile station to perform a Physical Downlink Control Channel (PDCCH) monitoring skipping, an index of a PDCCH monitoring skipping period, or a definition of a PDCCH monitoring skipping period. The method further includes the wireless access node transmitting to the mobile station the indication information.

The above embodiments and other aspects and alternatives of their implementations are described in greater detail in the drawings, the descriptions, and the claims below.

DETAILED DESCRIPTION

A wireless access network provides network connectivity between mobile stations and an information or data network (such as a voice communication network or the Internet). An example wireless access network may be based on cellular technologies, which may further be based on, for example, 4G, Long Term Evolution (LTE), 5G, New Radio (NR), and/or New Radio Unlicensed (NR-U) technologies and/or formats.

Figure 1:
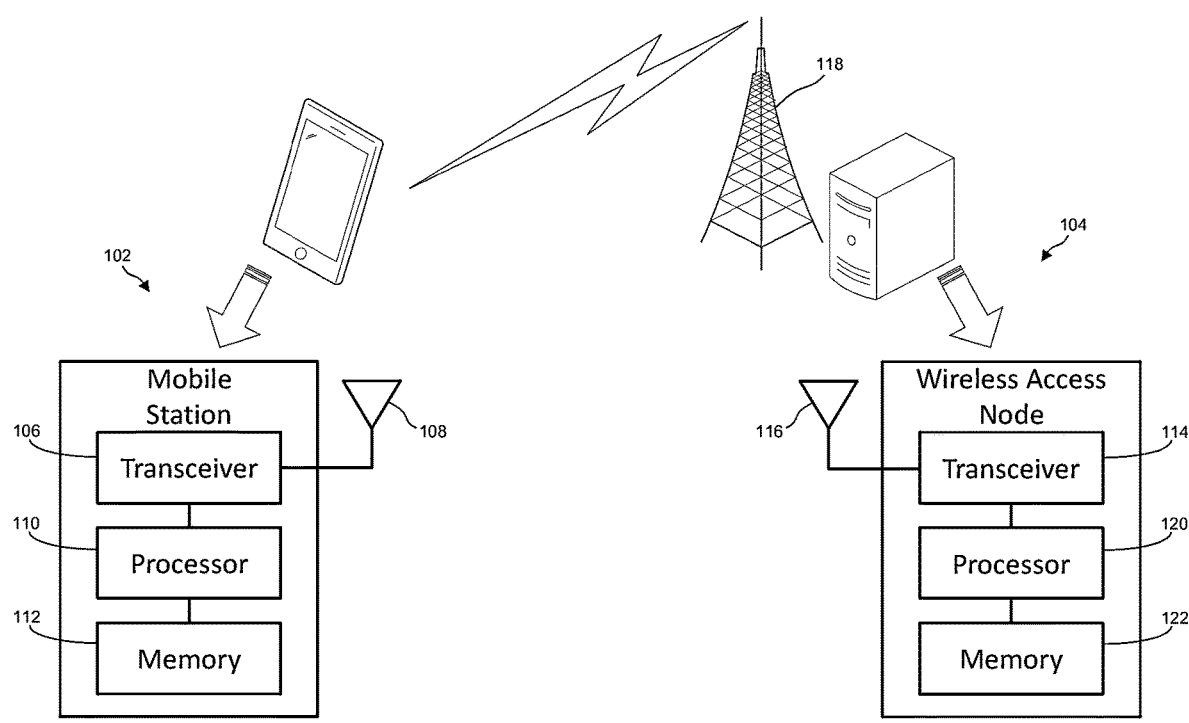
FIG. 1 shows an example system diagram including a mobile station and a wireless access node according to various embodiments.

FIG. 1 shows an example system diagram including a mobile station 102 and a wireless access node 104 according to various embodiments. The mobile station 102 may comprise a user equipment (UE), which may further include but is not limited to a mobile phone, smart phone, tablet, laptop computer, or other mobile devices that are capable of communicating wirelessly over a network. The mobile station 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, the wireless access node 104 may comprise a base station or other wireless network access points capable of communicating wirelessly over a network with one or many mobile stations. For example, the wireless access node 104 may comprise a 4G LTE base station, a 5G NR base station, a 5G central-unit base station, a 5G distributed-unit base station, or a next generation Node B (gNB), an enhanced Node B (eNB), or other base station, in various embodiments. The wireless access node 104 may include transceiver circuitry 114 coupled to an antenna 116, which may include an antenna tower 118 in various approaches, to effect wireless communication with the mobile station 102. The transceiver circuitry 114 may also be coupled to one or more processors 120, which may also be coupled to a memory 122 or other storage device. The memory 122 may store therein instructions or code that, when read and executed by the processor 120, cause the processor 120 to implement various ones of the methods described herein.

The wireless access network may provide or employ various transmission formats and protocols for wireless message transmission between the mobile station 102 and the wireless access node 104. In the existing long term evolution (LTE) and 5G new radio (NR) access technology communication systems, the mobile station 102 (e.g., user equipment (UE)) needs to know the uplink scheduling grant information for sending physical uplink shared channel (PUSCH) and downlink scheduling allocation information for receiving physical downlink shared channel (PDSCH). The information is included in the downlink control information (DCI) and is sent by the wireless access node (e.g., base station or gNB) to the mobile station (e.g., UE) on the physical downlink control channel (PDCCH) in different DCI formats. Therefore, the mobile station should first monitor the PDCCH.

Figure 2:
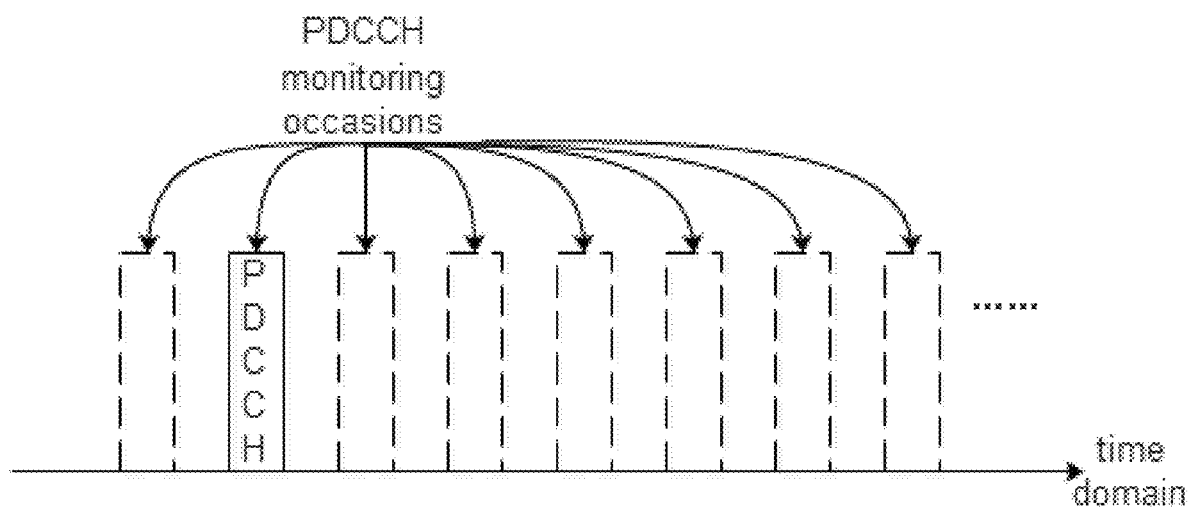
FIG. 2 shows an example timing diagram illustrating an example PDCCH monitoring behavior according to various embodiments.

The UE needs to keep monitoring PDCCH in PDCCH monitoring occasions to avoid missing any data scheduling information. The PDCCH monitoring occasions are determined by parameters of periodicity ks, a duration Ts in a periodicity, and an offset Os associated with the start position of a periodicity. These parameters are configured in SearchSpace information element (IE) in the radio resource control (RRC) signaling, and may, at least in part, define a search space set. FIG. 2 shows a timing diagram illustrating an example PDCCH monitoring behavior having ks=2 slot, Ts=1 slots, and Os=0. The PDCCH monitoring occasions 202 are shown interspaced with slots where no monitoring occurs, according to the example PDCCH monitoring behavior.

Figure 3:
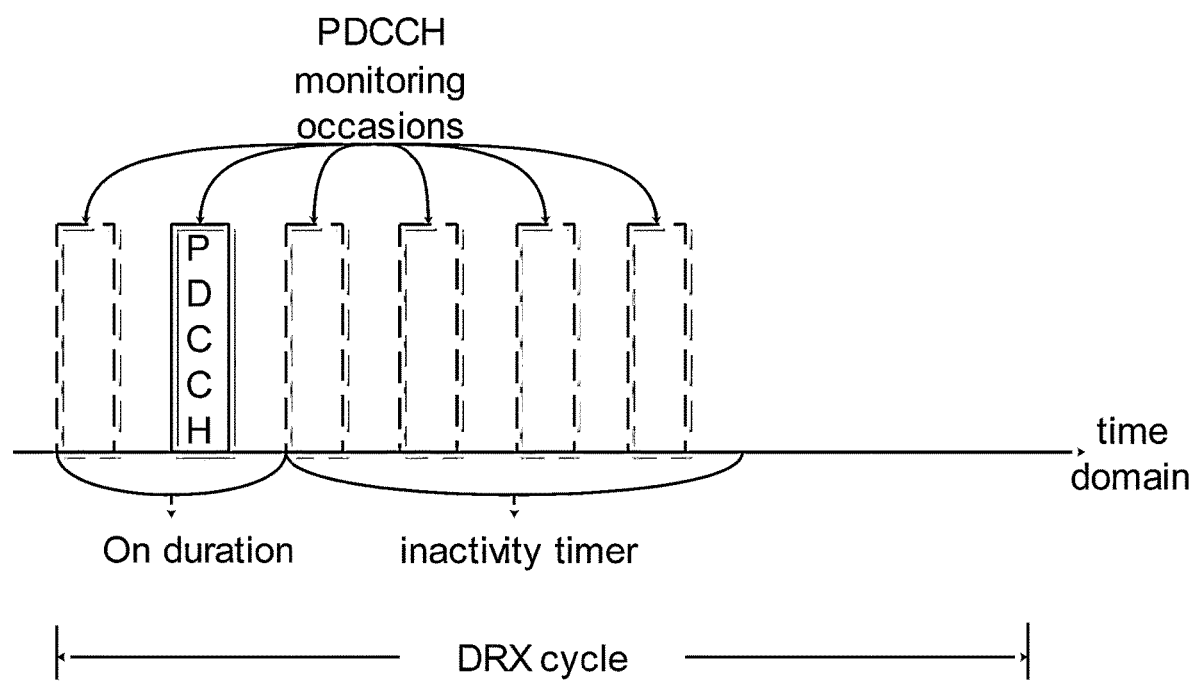
FIG. 3 shows another example timing diagram illustrating an example PDCCH monitoring behavior according to various embodiments.

In various examples, as is also shown in FIG. 3, the mobile station may implement a Discontinuous Reception (DRX) mode to implement power savings. The basic mechanism of DRX is to configure a DRX cycle for mobile station. A drx-ondurationTimer begins a DRX cycle, during which the mobile station is in a "DRX On" state and continues monitoring the PDCCH. If the mobile station successfully decodes a Downlink control information (DCI), the mobile station stays awake (in "DRX On" state) and starts an inactivity timer drx-inactivityTimer. The mobile station can go back to sleep (in "DRX off" state) after the drx-ondurationTimer or drx-inactivityTimer expires. In "DRX off," the mobile station does not monitor PDCCH, and therefore reduces power consumption. However, according to previous solutions, during "DRX On," the mobile station is continues monitoring PDCCH for the entire "DRX on" time is not saving power. The PDCCH monitoring behavior of the mobile station still consumes much unnecessary power during "DRX on." In a sparse traffic model, for example, particularly for a longer DRX cycle configuration, even more power for monitoring PDCCH is wasted.

Other power saving solutions have been proposed. For example, During "DRX On," the mobile station can be configured with at least one minimum applicable scheduling offset (i.e., K0min and/or K2 min), and a DCI can indicate an index of the configured value. If the indicated value of K0min and/or K2 min is greater than 0, the power consumption of PDCCH monitoring in a slot can be reduced and additional power saving can be realized by the mobile station. However, these solutions are still not optimal.

The methods provided in the current disclosure describe a power savings method in which the mobile station performs a PDCCH monitoring skipping, for example, during "DRX on." By this, the mobile station does not monitor PDCCH for a time period (or a duration), even during "DRX on," which decreases the number of slots the mobile station needs to monitor to achieve further power savings. For example, if one or more PDCCH monitoring occasions is within a time of the PDCCH skipping period, the mobile station 102 does not monitor the PDCCH monitoring occasion(s).

Figure 4:
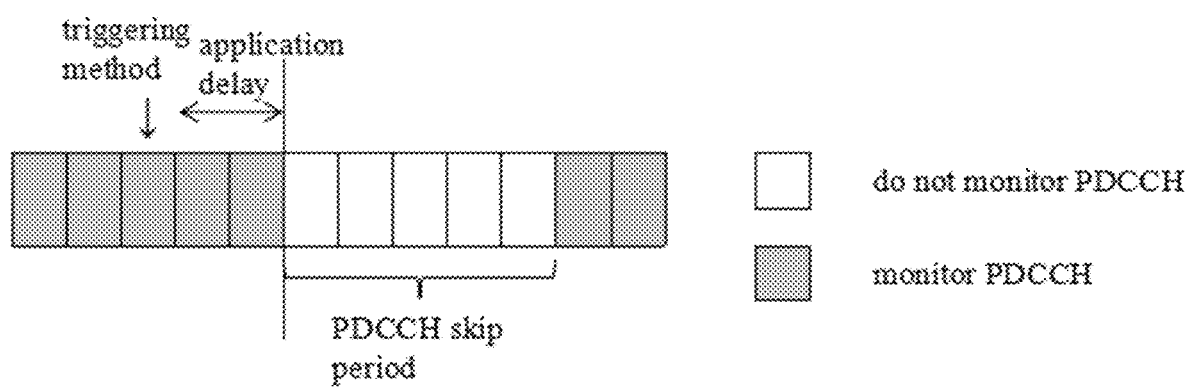
FIG. 4 shows another example timing diagram illustrating various embodiments.

FIG. 4 shows an example timing diagram illustrating various aspects of the present disclosure. A series of units, such as slots or times, are shown. After the occurrence of a skip triggering event or in response to a predetermined information, a PDCCH monitoring skipping may be performed for a skipping period of a duration of a first number of units (e.g., slots, time, etc.). Optionally, an application delay may be applied after the skip triggering event and prior to performing the PDCCH monitoring skipping for the skipping period, during which the mobile station 102 continues to monitor PDCCH. In some embodiments, after a PDCCH monitoring skipping, the mobile station 102 may resume monitoring PDCCH normally. In other embodiments, after a PDCCH monitoring skipping, the mobile station 102 may monitor PDCCH using a new search space set. For example, in the new search space set, the periodicity may be larger than the periodicity of old search space set and/or the duration may be less than the duration of old search space set.

Figure 5:
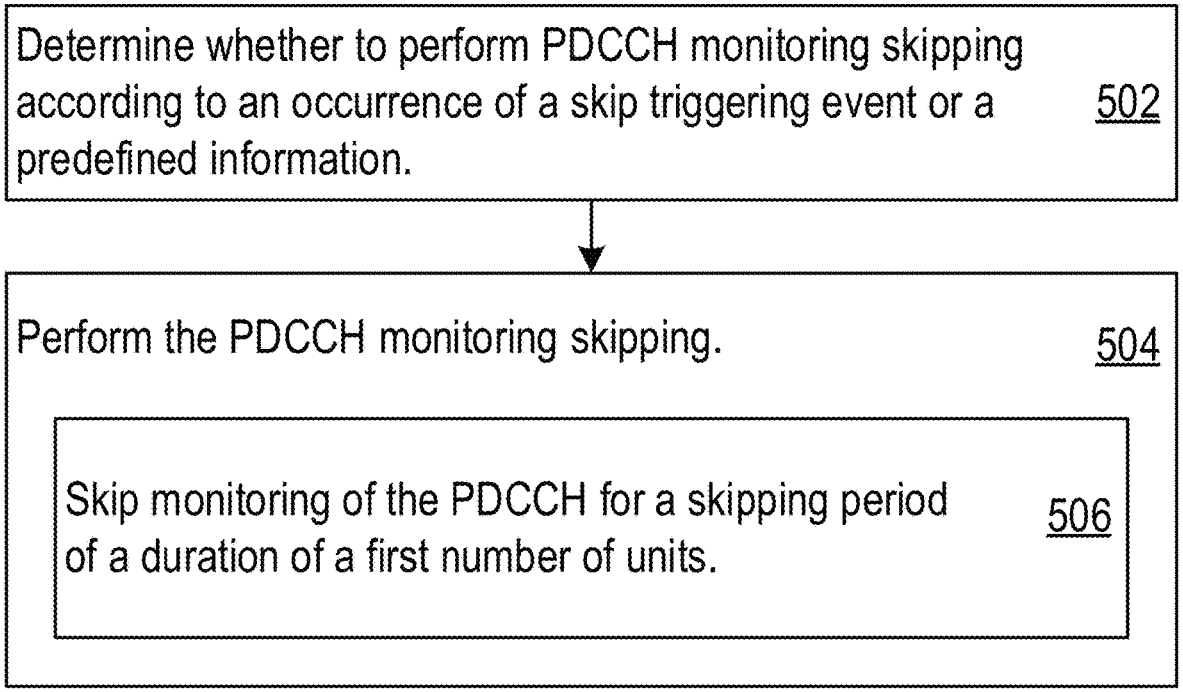
FIG. 5 provides an example flow diagram illustrating a method performed by the mobile station according to various embodiments.

FIG. 5 provides an example flow diagram illustrating a method 500 performed by the mobile station 102 according to various embodiments. At step 502, the mobile station 102 determines whether to perform the PDCCH monitoring skipping according to at least one of an occurrence of a skip triggering event or a predefined information. At step 504, in response to the mobile station 102 determining to perform the PDCCH monitoring skipping in step 502, the mobile station performs the PDCCH monitoring skipping. As shown at 506, the PDCCH monitoring skipping includes skipping, by the mobile station 102, monitoring of the PDCCH for a skipping period of a duration of a first number of units.

The PDCCH skipping period is a number of units (or time) in which the mobile station does not monitor PDCCH. It may be an integer greater than or equal to 0 (e.g., 1). A unit may comprise slots, PDCCH monitoring occasions, PDCCH monitoring periodicity, or (sub-)frames, or milliseconds, or PDCCH monitoring durations.

The disclosed solution involves at least the following: A skip triggering method (how a mobile station is instructed to perform or not to perform a PDCCH monitoring skipping); Application delay (how an application delay is determined, communicated, and/or implemented); and PDCCH skipping period (how the skipping period is determined, communicated, and/or implemented).

A mobile station 102 is triggered to perform the PDCCH monitoring skipping by various methods, each of which is discussed below. In various embodiments, the mobile station 102 may be triggered to perform the PDCCH monitoring skipping by a predefined signaling, by detection of a predefined signaling, by a predefined information, and/or by a default method.

Triggering by a Predefined Signaling

The wireless access node 104 may send a predefined signaling and/or a high-layer signaling (e.g., Radio Resource Control (RRC) signaling) to the mobile station 102. The predefined signaling may indicate at least one of the following: whether or not to perform the PDCCH monitoring skipping, an index of a PDCCH skipping period to use, or a definition of a PDCCH skipping period (e.g., a number of units to skip for). High-layer signaling may configure at least one PDCCH skipping period candidates. In certain approaches, the high-layer signaling may include a PDCCH monitoring duration and/or a PDCCH skipping period.

Figure 6:
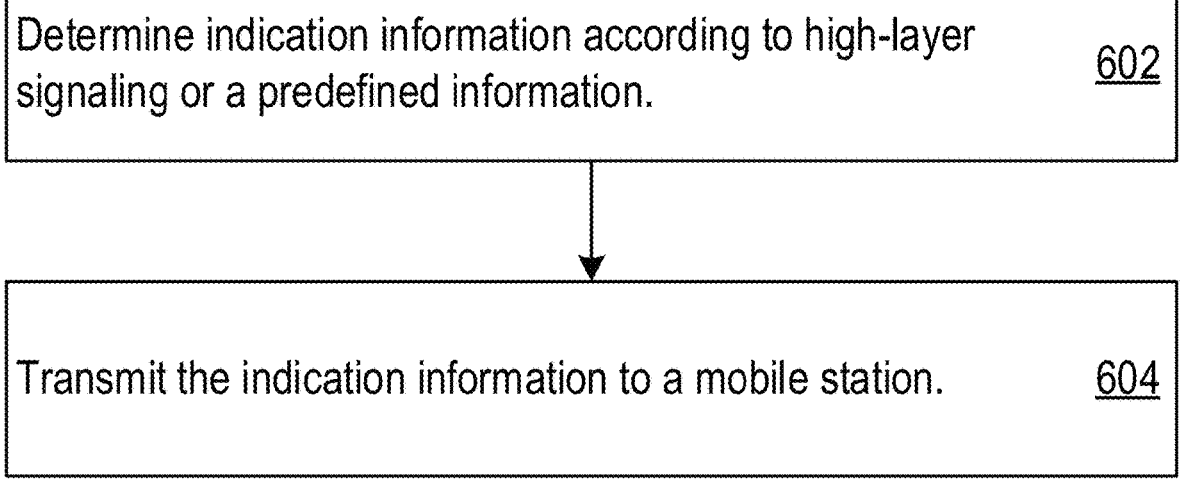
FIG. 6 provides an example flow diagram illustrating a method of communicating between a wireless access node and a mobile station according to various embodiments.

FIG. 6 provides an example flow diagram illustrating a method 600 of communicating between the wireless access node 104 and the mobile station 102 according to various embodiments. At step 602, the wireless access node 104 determines indication information, according to at least one of a high-layer signaling or a predefined information, wherein the indication information comprises at least one of an indication for a mobile station to perform a Physical Downlink Control Channel (PDCCH) monitoring skipping, an index of a PDCCH monitoring skipping period, or a definition of a PDCCH monitoring skipping period. At step 604, the wireless access node 104 transmits to the mobile station 102, the indication information. In some embodiments, the indication information is sent in a predefined signaling.

The mobile station receives the indication information (e.g., within a predefined signaling) sent by the wireless access node 104, determines a PDCCH skipping period according to the predefined signaling and/or a high-layer signaling, and performs the PDCCH monitoring skipping by not monitoring the PDCCH during the PDCCH skipping period. The mobile station may perform the PDCCH monitoring skipping after an application delay, for example, 1 slot after receiving the predefined signaling.

As such, in an example method performed by the mobile station 102, the skip triggering event may comprise receiving, from the wireless access node 104, indication information instructing the mobile station to perform the PDDCH monitoring skipping. The indication information may be received within or as part of a predefined signaling in various embodiments. As stated above, the indication information may comprise at least one of an instruction or indication to perform or not to perform the PDCCH monitoring skipping, an index of the skipping period to be used, and/or a definition of the duration of the first number of slots of the skipping period. The mobile station 102 may then determine to perform or not to perform the PDCCH monitoring skipping in accordance with the received indication information and/or in accordance with high-layer signaling.

In various approaches, if the wireless access node 104 does not send a high-layer signaling which configures at least one PDCCH skipping period candidate for the mobile station 102, the mobile station 102 may not perform a PDCCH monitoring skipping. Otherwise, the mobile station 102 may determine to perform or not to perform the PDCCH monitoring skipping in accordance with the received indication information.

In some approaches, if the mobile station 102 receives a first predefined signal that triggers a PDCCH monitoring skipping, and the mobile station 102 receives a second predefined signal which indicates to not perform a PDCCH monitoring skipping before the mobile station 102 finishes the previous PDCCH skipping, the mobile device 102 will monitor the PDCCH normally after another application delay. In one particular example, the first predefined signal can be a Downlink Control Information (DCI), and the second predefined signal can be a Medium Access Control (MAC) Control Element (CE). In one example, the mobile device 102 will monitor the PDCCH normally in the beginning of next PDCCH monitoring duration. In another example, if the mobile station receives a first predefined signal which triggers the PDCCH monitoring skipping, and the mobile station 102 receives a second predefined signal which also triggers a PDCCH monitoring skipping before the mobile station finishes the previous PDCCH skipping, the mobile station 102 will perform another PDCCH monitoring skipping right after the previous PDCCH skip.

In various approaches, the predefined signaling (e.g., which includes the indication information) is transmitted by the wireless access node 104 to the mobile station 102 as at least one of the following: a Downlink Control Information (DCI), a Medium Access Control (MAC) Control Element (CE), and/or a Radio Resource Control (RRC) signaling. In some embodiments, the predefined signaling is a MAC CE. The MAC CE can be used to at least stop a PDCCH monitoring skipping. That is, if the mobile station 102 receives a MAC CE indicating to stop PDCCH monitoring skipping, The mobile station 102 may continue monitoring PDCCH, for example after an application delay.

In some embodiments, the predefined signaling (e.g., which includes the indication information) is a DCI. The DCI may be used to indicate whether or not the mobile device 102 is to perform a PDCCH monitoring skipping, or provides an index or a definition of a PDCCH skipping period according to an information field in the DCI. The information field may comprise at least one of an indication to perform the PDCCH monitoring skipping, an index of the skipping period, and/or a definition of the duration of the first number of units of the skipping period. The field may be X bits, wherein X may be an integer greater than 0 and less than 10. In some embodiments, the DCI is DCI format 0_1 or 1_1 or 2_0. In some embodiments, the field in the DCI is a dedicated field which is used to indicate an information of PDCCH skipping. In other embodiments, the field in the DCI is an existing information field that is repurposed, such as, for example, a minimum applicable scheduling offset indication field (e.g., K0min and/or K2 min). Repurposing an existing field may involve using at least a portion of an existing field and repurposing the information included within that field for the purposes of at least PDCCH monitoring skipping indication information.

In various approaches, a field in the DCI format 0_1 or 1_1 is used to indicate the minimum applicable scheduling offset (or minimum applicable scheduling offset restriction), K0min and/or K2 min. The field may also be used to indicate performance of a PDCCH monitoring skipping, for example, if a PDCCH skipping period is already configured. In one example, if there is only one PDCCH skipping period configured, a "0" in this field indicates to trigger performance of a PDCCH monitoring skipping for a PDCCH skipping period (e.g., after an application delay), and a "1" in this field indicates to not perform the PDCCH skipping. In other examples, if there are two PDCCH skipping period configured, a "0" in the field may indicate to trigger a PDCCH monitoring skipping for a lower index of a PDCCH skipping period (e.g., after an application delay), and a "1" in the field may indicate to trigger a PDCCH monitoring skipping for a higher index of a PDCCH skipping period (e.g., after an application delay). In still other examples, if there is no PDCCH skipping period configured, a "0" in this field indicates to trigger performance of a PDCCH monitoring skipping for a PDCCH skipping period (e.g., after an application delay), and a "1" in this field indicates to not perform the PDCCH skipping, the PDCCH skipping period may be the same as the minimum applicable scheduling offset (e.g., K0min). The application delay may be the same as the application delay of the minimum applicable scheduling offset restriction. In some examples, the field is present only when a minimum applicable scheduling offset or a PDCCH skipping period is configured by RRC.

In some embodiments, every DCI that the mobile station 102 received with the field which indicates a PDCCH skipping information will trigger a PDCCH monitoring skipping. In some embodiments, only a DCI that indicates a change of the indication regarding the PDCCH monitoring skipping information or a K0min or K2 min will trigger a PDCCH monitoring skipping. In some embodiments, PDCCH monitoring skipping information comprises a PDCCH skipping period.

In some embodiments, the field is present if at least one of the following two parameters is configured: a minimum applicable scheduling offset (e.g., K0min or K2 min), or a PDCCH skipping period (or another PDCCH skipping parameter). If the minimum applicable scheduling offset is not configured by RRC, the field may be used to only indicate, trigger, and/or control a PDCCH monitoring skipping.

Triggering by Detection of a Predefined Signaling

In a slightly different approach to the one described above, the wireless access node 104 may send a predefined signaling and/or a high-layer signaling to mobile station 102. The mobile station 102 then detects the predefined signaling as a skip triggering event, providing the indication for the mobile station 102 to perform the PDCCH monitoring skipping. If the mobile station 102 receives the predefined signaling sent by the wireless access node 104, the mobile station 102 performs the PDCCH monitoring skipping after an application delay. However, if the mobile station 102 does not receive any such predefined signaling, the mobile station 102 will continue to monitor PDCCH.

In some embodiments, the predefined signaling may be monitored by the mobile station 102 when a drx-InactivityTimer is running. In some embodiments, the predefined signaling may be monitored by the mobile station 102 when mobile station 102 is in "DRX on" mode.

In some embodiments, the predefined signaling is a DCI. A field in the DCI may be used to indicate whether or not the DCI is used for PDCCH skipping. For example, if this field is set to "1," the DCI is used to trigger a PDCCH monitoring skipping. But, if this field is set to "0," the DCI is not used for PDCCH skipping indication. In some embodiments, if this field is set to "1," one or more other fields in this DCI can be used to indicate a PDCCH skipping period. In one example, one or more other fields in this DCI used to indicate PDCCH skip period may be according to a bitmap. The bitmap may indicate whether or not to monitor PDCCH in a several units (e.g., slots). In another example, one or more other fields in this DCI used to indicate PDCCH skip period indicates a value (e.g., a definition) or an index of a PDCCH skipping period.

Triggering by a Predefined Information

In some embodiments, the mobile station 102 uses a predefined information to determine whether or not to monitor a PDCCH in a PDCCH skipping period after an application delay. In various examples, the predefined information may be at least one of the following: a timer, a Bandwidth Part (BWP), a maximum MIMO layer, a Frequency Range (FR) type, type of mobile station, a mobile station (UE) capability, UE assistance information, or subcarrier spacing (SCS). In some embodiments, the predefined information may be a high-layer signaling (e.g., a RRC signaling). In various approaches, the PDCCH skipping period is indicated according to at least one of: the high-layer signaling, a predefined value, a DCI, a MAC CE, or a minimum applicable scheduling offset.

In some embodiments, the predefined information is a timer, wherein the occurrence of the skip triggering event comprises an expiration of the timer. That is, if the timer expires, the mobile station 102 does not monitor PDCCH for a PDCCH skip period after an application delay. In some approaches, the wireless access node 104 sets and/or determines the timer value and transmits it to the mobile station. The wireless access node 104 may set or determine the timer value depending on at least one of a Bandwidth Part (BWP) or carrier component (CC). In some embodiments, the mobile station 102 starts or restarts the timer after receiving a downlink (DL) assignment or an uplink (UL) grant, or receiving a DCI indicates a new transmission. In some embodiments, the timer is started or restarted after a PDCCH monitoring skipping, or, in other words, the timer is started or restarted at the first slot in which the mobile station 102 (re-)starts monitoring PDCCH. In some embodiments, the mobile station 102 starts or restarts the timer after receiving an RRC signaling which configures a parameter of the PDCCH skipping period. In some embodiments, the mobile station 102 starts or restarts the timer after a BWP switch. In some embodiments, the timer is configured per BWP. In some embodiments, the timer is configured per mobile station or per carrier component (CC).

In other embodiments, the predefined information is the BWP. For example, in some BWP, the mobile station 102 can trigger PDCCH monitoring skipping by DCI or a timer. However, in the other BWP, the mobile station 102 may not be able to trigger PDCCH monitoring skipping by a DCI or a timer. For example, in BWP 1, the mobile station 102 may not be able to perform PDCCH monitoring skipping, while the mobile station 102 may be able to perform PDCCH monitoring skipping in other BWPs. In another example, the mobile station 102 may trigger a PDCCH monitoring skipping if the BWP bandwidth is greater than $M_{BWP}$ MHz (e.g., where $M_{BWP}$ is an integer greater than 20), otherwise, the mobile station 102 may stop a PDCCH skipping. In another example, the mobile station 102 may trigger a PDCCH monitoring skipping if the BWP bandwidth is less than or equal to $M_{BWP}$ MHz (e.g., where $M_{BWP}$ is an integer greater than 20), otherwise, the mobile station 102 may stop a PDCCH skipping.

In some embodiments, the mobile station 102 may trigger a PDCCH monitoring skipping for a total of M cycles. For example, one cycle may involve the mobile station 102 skipping monitoring (not monitoring) PDCCH for a time duration (e.g., PDCCH skipping period of a duration of a first number of units) and then monitor PDCCH for another time duration (e.g., a monitoring period of a duration of a second number of units). M may be an integer greater than 0 and, for example, less than 10.

In some embodiments, the predefined information may be a maximum MIMO layer. For example, if the maximum MIMO layer is larger than 2, the mobile station 102 may trigger a PDCCH monitoring skipping, otherwise, the mobile station 102 stops or will not trigger a PDCCH monitoring skipping. In another example, if the maximum MIMO layer is not larger than 2, the mobile station 102 may trigger a PDCCH monitoring skipping, otherwise, the mobile station 102 stops or will not trigger a PDCCH monitoring skipping.

In some embodiments, the predefined information is related to a frequency range (FR) type. For example, the mobile station 102 may trigger a PDCCH monitoring skipping by a DCI or a timer in FR 2, while the mobile station may not trigger a PDCCH monitoring skipping in FR 1. In another example, the mobile station 102 may not trigger a PDCCH monitoring skipping by a DCI or a timer in FR 2, while the mobile station may trigger a PDCCH monitoring skipping in FR 1.

In some embodiments, the predefined information is UE assistance information. For example, the mobile station 102 sends a UE assistance information to the wireless access node 104 with a preferred PDCCH skipping period. The wireless access node 104 may send a confirmation signaling.

The mobile station 102 may receive the confirmation signaling and may trigger a PDCCH monitoring skipping for the preferred PDCCH skipping period according to an occurrence of a skip triggering event or a predefined information. The confirmation signaling may comprise an index of or a definition of the skipping period corresponding to the preferred skipping period.

In some embodiments, the predefined information is related to a mobile station type (e.g., UE type) or a mobile station capability (e.g., UE capability). For example, a mobile station type or capability may not support PDCCH monitoring skipping. In various approaches, if a mobile station 102 that does not support a PDCCH monitoring skipping receives a PDCCH skip indication (e.g., a DCI with the indication), the mobile station 102 can ignore the indication information of the PDCCH skipping. Similarly, in various approaches, if a mobile station 102 does not support PDCCH monitoring skipping, the wireless access node 104 may not send indication information of PDCCH skipping to the UE.

In various embodiments, the mobile station 102 will perform the PDCCH monitoring skipping only when the mobile station is in a DRX active time (e.g., "DRX on" mode).

Triggering a Default PDCCH Monitoring Skipping Behavior

In some embodiments, performing the PDCCH monitoring skipping comprises performing a default PDCCH monitoring skipping. In certain approaches, the default PDCCH monitoring skipping comprises monitoring, by the mobile station 102, the PDCCH for a monitoring period of a duration of a second number of units after skipping monitoring of the PDCCH for the skipping period. In some embodiments, if a high-layer signaling configures at least one PDCCH skipping period candidate, and the mobile station 102 does not receive a DCI that triggers a PDCCH monitoring skipping, the mobile station 102 may perform a default PDCCH monitoring skipping.

In one example, a default PDCCH monitoring skipping comprises the mobile station 102 performing a PDCCH monitoring skipping according to a default PDCCH skipping period (e.g., of a duration of first number of units). A default PDCCH skipping period may be a PDCCH skipping period candidate configured by the high-layer signaling. After that, the mobile station 102 may monitor the PDCCH for a monitoring period of a duration of a second number of units. In some embodiments, the second number of units is determined according to a time in which the UE monitors a full duration for each search space set. In certain embodiments, the mobile station may repeat a cycle of the skipping and the monitoring as part of the default. In further embodiments, the mobile station 102 may repeat the cycle of the skipping and the monitoring for a number M of cycles. M may be an integer greater than 0 and less than 50 (e.g., 1). In various examples, the cycles may begin after the mobile station 102 monitors PDCCH for a full duration of at least one search space set.

Figure 7:
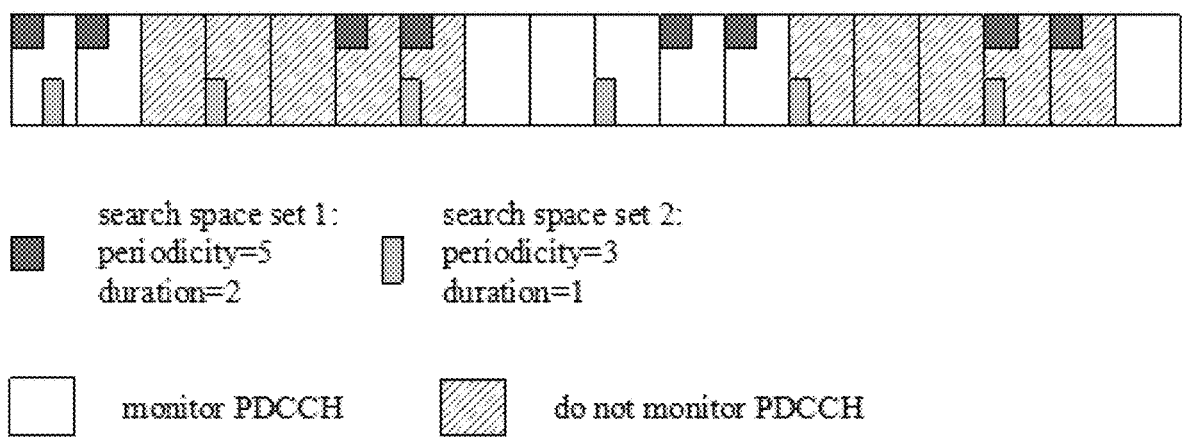
FIG. 7 shows an example timing diagram illustrating various aspects of a default cycle according to various embodiments.

FIG. 7 shows an example timing diagram illustrating various aspects of the default cycle discussed above. For example, a series of units (e.g., slots) are shown. Two example search space sets are shown within the slots. A first example search space set 1 is shown with a periodicity ks=5 and a duration Ts=2. A second example search space set 2 is shown with a periodicity ks=3 and a duration Ts=1. For each DL BWP configured for a UE in a serving cell, the mobile station 102 may be provided by higher layers with S≤10 search space sets where, for each search space set from the S search space sets, the UE is provided the following by SearchSpace: a search space set index; a PDCCH monitoring periodicity and a PDCCH monitoring offset of Os slots, by monitoringSlotPeriodicityAndOffset; a duration of Ts<ks slots indicating a number of slots that the search space set S exists by duration.

A default PDCCH skipping pattern cycle is shown, including a PDCCH skipping period of a duration of a first number of units, being five slots, and a monitoring period of a duration of a second number of units, also being five slots. The shaded slots indicate where the mobile station 102 performs PDCCH monitoring skipping, where it does not monitor PDCCH.

In some embodiments, the mobile station 102 may perform a default PDCCH monitoring behavior if at least one of the following predefined conditions is satisfied (e.g., as an occurrence of a skip triggering event): 1) One or more PDCCH skipping periods is configured, and the mobile station 102 does not receive a PDCCH that triggers a PDCCH monitoring skipping, or 2) A BWP switch, e.g., a timer based BWP switch, occurs.

In certain approaches, the default behavior includes the mobile station 102 performing a PDCCH monitoring skipping, wherein the PDCCH skipping period is a default PDCCH skipping period. In other approaches, the default behavior includes the mobile station 102 performing M cycles of PDCCH monitoring skipping, wherein a cycle involves the mobile station 102 not monitoring PDCCH during a default PDCCH skipping period, and then monitoring PDCCH for a second time period (e.g., the second number of units). The mobile station 102 will continue to perform the cycles (e.g., up to M) as long as it does not receive a DL assignment, a UL grant or a new transmission indication. However, if the mobile station 102 receives a DL assignment or UL grant or a new transmission indication or a Medium Access Control (MAC) Control Element (CE) which indicates to stop a PDCCH monitoring skipping, the mobile station 102 stops performing the PDCCH monitoring skipping and continues monitoring PDCCH or follows the triggered behavior indicated by a DCI.

In various embodiments, the second time period (e.g., second number of units) may be a full PDCCH monitoring duration, a PDCCH monitoring occasion, a number of PDCCH monitoring periodicity, a number of slots, or a number of milliseconds. In certain approaches, the monitoring period (e.g., the second number of units) may correspond to a periodicity of a search space set. Similarly, in certain approaches, the skipping period (e.g., the first number of units) may correspond to at least one of an integer multiple of a periodicity of a search space or a default number of units.

Fallback Behavior

Some events may trigger the mobile station 102 to operate according to a fallback behavior. In various embodiments, the triggering event may include:

1) Trigger a physical random access procedure, e.g., triggered by higher layers or by a PDCCH order, or due to Beam failure recovery;
2) A radio link failure;
3) A handover command;
4) A BWP switch, e.g., timer based BWP switch; and/or
5) The mobile station 102 entering a DRX off mode, for example, due to expiration of the drx-OndurationTimer or drx-inactivity Timer.

The fallback behavior may include the mobile station 102 stopping a PDCCH monitoring skipping. That is, if the mobile station 102 is in a PDCCH skipping period and is not monitoring PDCCH, if one of the above events occur, the mobile station 102 may start monitoring PDCCH if UE is in an active-time. An active-time comprises a total duration that the mobile station 102 monitors PDCCH. This may include the "on-duration" of the DRX cycle, being the time the mobile station 102 performs continuous reception while the inactivity timer drx-inactivityTimer has not expired, and the time when the UE is performing continuous reception while waiting for a retransmission opportunity.

In some embodiments, a default PDCCH skipping period (X_default) is related to a PDCCH monitoring duration. In one example, X_default=A*PDCCH monitoring duration, wherein A is an integer greater than 0 (e.g., 1). In some embodiments, a default PDCCH skipping period (X_default) is related to a PDCCH monitoring period. In one example, X_default=A1*PDCCH monitoring period, wherein A1 is an integer greater than 0 (e.g., 1). In other embodiments, a default PDCCH time skip period (X_default) is related to a K0min or K2 min or a value $Z\mu$.

Combination Triggering Method

In some embodiments, the wireless access node 104 sends a predefined signaling and/or a high-layer signaling to mobile station 102. The mobile station 102 receives the predefined signaling from the wireless access node 104 and determines a PDCCH skipping period according to the predefined signaling and/or a high-layer signaling. The mobile station 102 then will skip the monitoring of the PDCCH during a PDCCH skipping period after an application delay. In various embodiments, a predefined signaling is a DCI. High-layer signaling may indicate at least one PDCCH skipping periods.

If the mobile station 102 is configured with at least one PDCCH skipping period by high-layer signaling, and does not receive a DCI that triggers a PDCCH monitoring skipping, the mobile station 102 can start a timer. The timer may restart after receiving a new data scheduling or performing a PDCCH monitoring skipping. After the timer expires, the mobile station 102 may perform a PDCCH monitoring skipping after a first application delay (e.g., 0 or 1 slot), and may restart the timer after performing the PDCCH monitoring skipping. If the mobile station 102 receives a DCI triggering a PDCCH monitoring skipping, the mobile station 102 does the PDCCH skipping after a second application delay (e.g., related to an application delay of minimum applicable scheduling offset restriction) and may restart the timer after performing the PDCCH monitoring skipping. In some embodiments, the first application delay is different from the second application delay.

Determining the Application Delay

As discussed above, in some embodiments, the wireless access node 104 sends a predefined signaling and/or a high-layer signaling to the mobile station 102. The predefined signaling includes indication information that indicates at least one of the following: whether or not to perform PDCCH monitoring skipping, an index of a PDCCH skipping period, or a definition of a PDCCH skipping period. The indication information will be valid after an application delay. As such, the PDDCH monitoring skipping further comprises waiting an application delay prior to initiating the skipping of the monitoring of PDCCH for the skipping period, the application delay comprising a second number of units after the occurrence of the skip triggering event (e.g., reception of the indication information).

The application delay may be determined based on at least one of the following: an application delay of a minimum scheduling offset restriction, a minimum applicable scheduling offset, a subcarrier spacing (SCS), a Frequency Range (FR) type, a value (4) associated with the SCS, K0, K2, a Physical Downlink Shared Channel (PDSCH) processing procedure time, a Bandwidth Part (BWP), the PDCCH skipping period, a Radio Resource Control (RRC) signal, or a fixed value.

$Z\mu$ is a fixed value associate with an SCS. For example, $Z\mu$ is one of 1, 1, 2, or 2, each value mapping to SCS of 15 kHz, 30 kHz, 60 kHz, or 120 kHz. That is, if SCS is 15 kHz, $Z\mu$ is equal to 1, if SCS is 60 kHz, $Z\mu$ is equal to 2. K0 is a slot offset between DCI and its scheduled physical downlink shared channel (PDSCH). K2 is a slot offset between DCI and its scheduled physical uplink shared channel (PUSCH). FR type may include FR1 (Frequency range 1, comprising 410 MHz-7125 MHz) and FR2 (24250 MHz-52600 MHz).

In some embodiments, the application delay of PDCCH skip (X_skip) is determined based on an application delay of the minimum scheduling offset restriction. When the UE is scheduled with DCI format 0_1 or 1_1 with a "Minimum applicable scheduling offset indicator" field, the K0min and K2 min values to be applied can be determined, while the previously applied K0min and K2 min values are applied until the new values take effect after an application delay. K0min is the minimum slot offset between DCI and its scheduled physical downlink shared channel (PDSCH). K2 min is the minimum slot offset between DCI and its scheduled physical uplink shared channel (PUSCH).

For example, if a minimum applicable scheduling offset is configured by a high-layer signaling or a K0min and/or a K2 min are applied, when a DCI with a field which may indicate information of a PDCCH monitoring skipping is received within the first three symbols of the slot, the value of the application delay X_skip is determined by, $$X\_skip = \max\left(\left\lceil K_{0minOld} \cdot \frac{2^{\mu PDCCH}}{2^{\mu PDSCH}}, Z_\mu \right\rceil\right)$$

Where $K_{0minOld}$ is the currently applied K0min value of the active DL BWP in the scheduled cell, and $Z\mu$ is determined by the subcarrier spacing (SCS) of the active DL BWP in the scheduling cell (e.g., given in Table 1, below) and $\mu PDCCH$ and $\mu PDSCH$ are the subcarrier spacing (SCS) configurations for PDCCH and PDSCH, respectively. K0min is the minimum applicable value of K0. When a DCI with a field which may indicate information of PDCCH monitoring skipping is received outside of the first three symbols of the slot, the value of $Z\mu$ (from Table 1) is incremented by one before determining the application delay X_skip.

TABLE 1

| kHz | μ | $Z_\mu$ |
|---|---|---|
| 15 | 0 | 1 |
| 30 | 1 | 1 |
| 60 | 2 | 2 |
| 120 | 3 | 2 |

In some embodiments, the application delay (X_skip) is determined based on a fixed value. For example, if a BWP is not configured with a K0min and/or a K2 min, the X_skip may be equal to a fixed value M. M may be an integer greater than or equal to 0 and less than 20 (e.g., 1).

In some embodiments, the application delay (X_skip) is determined based on a minimum applicable scheduling offset (K0min) on the scheduling cell in which the DCI is received. For example, X_skip=K0min.

In some embodiments, the application delay (X_skip) is determined according to a SCS. For example, X_skip=2 slots for a BWP with SCS=15, 30 kHZ, and X_skip=4 slots for a BWP with SCS=60, 120 kHZ.

In some embodiments, the application delay (X_skip) is determined by a RRC signaling.

In some embodiments, the application delay (X_skip) is determined based on a PDCCH skipping period. For example, X_skip may be equal to a default PDCCH skipping period, wherein a default PDCCH skipping period is a PDCCH skip period configured by RRC.

In some embodiments, the application delay (X_skip) is determined based on a parameter of delta (A). The A is determined by a number of symbols based on PDCCH SCS counting from the end of the last symbol of the received PDCCH symbol to the beginning of the first symbol of the corresponding received PDSCH, quantized (using the granularity of PDSCH slot duration) to the next PDSCH slot boundary. For example, X_skip may be greater than or equal to delta (A).

In some embodiments, the application delay (X_skip) is determined based on a PDSCH processing procedure time. For example, X_skip may be equal to a PDSCH processing procedure time.

In some embodiments, the application delay (X_skip) is determined based on Zµ. For example, X_skip=Zµ.

In some embodiments, the application delay (X_skip) is determined based on K0. For example, X_skip=K0. In some embodiments, the application delay (X_skip) is determined based on K2. For example, X_skip=K2.

In some embodiments, if a DCI indicates a PDCCH skipping period, the mobile station 102 will not monitor a PDCCH after successful decoding a PDSCH or send an acknowledgement (ACK).

In some embodiments, the application delay (X_skip) is determined according to a PDCCH monitoring duration. For example, if a DCI indicates a PDCCH skipping period, the mobile station 102 will not monitor a PDCCH from the next PDCCH monitoring duration.

In some embodiments, a mobile station 102 can be indicated a PDCCH skip information according to a DCI and a timer, wherein the configuration of an application delay triggered by a DCI and a timer can be different from each other. In some embodiments, a mobile station 102 can be indicated a PDCCH skip information according to a DCI and a timer and a MAC CE, wherein the configuration of an application delay triggered by a DCI and a timer and a MAC CE are different from each other.

In some embodiments, the application delay (X_skip) is determined according to an application delay of minimum applicable scheduling offset restriction (X_min) and a fixed value (A). For example, if the mobile station 102 is configured with a minimum applicable scheduling offset in an active BWP, X_skip=X_min, otherwise, X_skip=A.

In some embodiments, in different situations, the application delay (X_skip) is different. For example, if the mobile station 102 is configured with a minimum applicable scheduling offset in an active BWP, X_skip=A, where A is a value related to an application delay of minimum applicable scheduling offset restriction. If a cross-BWP DCI triggers a PDCCH monitoring skipping, X_skip=B, where B is a value associate with a BWP switch delay. In other words, the mobile station 102 may perform a PDCCH skipping after a BWP switch. Otherwise, X_skip=C, where C is a fixed value (e.g., 1).

In some embodiments, if the mobile station 102 can perform a PDCCH monitoring skipping by a different method, the application delay may be different. For example, if the mobile station 102 does a PDCCH skip by a default method (discussed above), the application delay X_skip may be equal to 0 or 1 slot. If the mobile station 102 performs a PDCCH monitoring skipping triggered by a DCI, the application delay (X_skip) may be related to a minimum applicable scheduling offset (K0min), in some embodiments, X_skip=K0min.

In other embodiments, if a scheduling DCI is used to indicate a PDCCH skip, the mobile station 102 may not monitor PDCCH after successfully decode a PDSCH or sending an acknowledgement (ACK) or transmitting a PUSCH.

Determining the Skipping Period

The PDCCH skipping period is a number of units (or time) in which the mobile station does not monitor PDCCH. It may be an integer greater than or equal to 0 (e.g., 1). A unit may comprise slots, PDCCH monitoring occasions, PDCCH monitoring periodicity, or (sub-)frames, or milliseconds, or PDCCH monitoring durations.

In various embodiments, the skipping period is configured for or indicated to a mobile station 102 by at least one of a Downlink Control Information (DCI), a Medium Access Control (MAC) Control Element (CE), or a Radio Resource Control (RRC) message. In various embodiments, the skipping period is determined (e.g., by the wireless access node 104) based on at least one of a minimum applicable scheduling offset, a subcarrier spacing (SCS), a Frequency Range (FR) type, a Discontinuous Reception (DRX) mode on duration timer, a DRX inactivity timer, a Bandwidth Part (BWP) inactivity timer, an SCell deactivation timer, a subcarrier spacing (SCS), a periodicity (ks) of a search space set corresponding to the assigned monitoring slots, a monitoring duration (Ts) of the search space set, or a fixed value.

Maximum Configurable Value of PDCCH Skipping Period Value

The skipping period may be subject to a maximum configurable skipping period. The maximum configurable skipping period may correspond to at least one of a Discontinuous Reception (DRX) mode on duration timer, a DRX inactivity timer, a Bandwidth Part (BWP) inactivity timer, an SCell deactivation timer, a subcarrier spacing (SCS), a periodicity (ks) of a search space set, a monitoring duration (Ts) of the search space set, or a fixed value. For example, the maximum configurable value of the PDCCH skipping period may be associated with one of the following: drx-onDurationTimer, drx-InactivityTimer, bwp-Inactivity Timer, SCellDeactivationTimer, SCS, PDCCH monitoring periodicity, PDCCH monitoring duration, a fixed value, or UE assistance information.

In some embodiments, the maximum configurable value of the PDCCH skipping period (Max_period) may be associated with drx-onDurationTimer. For example, Max_period may be less than or equal to drx-onDurationTimer. In another example, Max_period=A*drx-onDurationTimer, where A is greater than or equal to 1 and less than, for example, 10. In another example, Max_period=drx-onDurationTimer−B, where B is greater than 0 and less than drx-onDurationTimer. The drx-onDurationTimer is the duration at the beginning of a DRX Cycle.

In some embodiments, the maximum configurable value of the PDCCH skipping period (Max_period) may be associated with drx-InactivityTimer. For example, Max_period may be less than drx-InactivityTimer. In another example, Max_period=A*drx-InactivityTimer, where A is greater than 0 and less than 1. In another example, Max_period=drx-InactivityTimer−B, where B is greater than 0 and less than drx-InactivityTimer. The drx-InactivityTimer is the duration after the PDCCH occasion in which a PDCCH indicates a new UL or DL transmission for the MAC entity.

In some embodiments, the maximum configurable value of the PDCCH skipping period (Max_period) may be associated with a bwp-InactivityTimer. For example, Max_period may be less than bwp-InactivityTimer. In another example, Max_period=A*bwp-InactivityTimer, where A is greater than 0 and less than 1. In another example, Max_period=bwp-InactivityTimer−B, where B is greater than 0 and less than bwp-InactivityTimer. The bwp-Inactivity Timer is the duration in milliseconds after which the UE falls back to the default Bandwidth Part (BWP). When the network releases the timer configuration, the UE stops the timer without switching to the default BWP.

In some embodiments, the maximum configurable value of the PDCCH skipping period (Max_period) may be associated with an sCellDeactivationTimer. For example, Max_period may be less than sCellDeactivationTimer. In another example, Max_period=A*sCellDeactivationTimer, where A is greater than 0 and less than 1. In another example, Max_period=sCellDeactivationTimer−B, where B is greater than 0 and less than sCellDeactivationTimer. The UE will deactivate the SCell if the sCellDeactivationTimer expires.

In some embodiments, the maximum configurable value of the PDCCH skipping period (Max_period) may be associated with a SCS. Different SCS may be associated with a same or different Max_period. A larger SCS may not be associate with a smaller Max_period then a Max_period associate with a smaller SCS.

In some embodiments, the maximum configurable value of the PDCCH skipping period (Max_period) may be associated with a PDCCH monitoring periodicity (ks). For example, Max_period=C*ks, where C is greater than or equal to 1 and less than, for example, 50.

In some embodiments, the maximum configurable value of the PDCCH skipping period (Max_period) may be associated with a PDCCH monitoring duration (Ts). For example, Max_period=C1*Ts, where C1 is greater than or equal to 1 and less than, for example, 50.

In some embodiments, the maximum configurable value of the PDCCH skipping period (Max_period) is a fixed value M1, where M1 is greater than 0 and less than, for example, 50 (e.g., 10).

In some embodiments, if the mobile station 102 detects a DCI with a DL assignment, it will trigger a drx-HARQ-RTT-Timer. If the drx-HARQ-RTT-Timer expires and the mobile station 102 does not successfully decode a corresponding PDSCH, drx-RetransmissionTimer will be triggered. If drx-RetransmissionTimer expires, the wireless access node 104 will send a DCI indicating a retransmission. So in order to not impact the receiving of the retransmission, in some embodiments, if a scheduling DCI is used to indicate or trigger PDCCH monitoring skipping, the time of PDCCH skipping period should not be greater than drx-Retransmission Timer+drx-HARQ-RTT-Timer.

PDCCH Skipping Period Configuration

One or more PDCCH skipping periods may be configured according to at least one of the following: a high-layer signaling, a DCI, a fixed value, a K0min, a K2 min, a Discontinuous Reception (DRX) mode on duration timer, a DRX inactivity timer, or a SCS. In this various embodiments, the PDCCH skipping period is configured by a high-layer signaling (e.g., RRC signaling). In some embodiments, the high-layer signaling includes at least one PDCCH skipping period. In one example, each PDCCH skipping period is used for all search space sets that apply the PDCCH monitoring skipping. Table 2, below, provides such an example, where A and B are integers greater than or equal to 0 units (e.g., slots).

TABLE 2

| index | PDCCH skip period |
|---|---|
| 0 | A (e.g., 1) |
| 1 | B (e.g., 4) |

In some embodiments, the high-layer configuration signaling includes at least one set of PDCCH skipping periods. Each set of PDCCH skipping periods includes a PDCCH skipping period for each search space set. Table 3, below, provides such an example, where A1, A2, A3, B1, B2, and B3 are integers greater than or equal to zero units (e.g., slots) and less than, for example, 50 units (e.g., slots).

TABLE 3

| index | PDCCH skip period for search space set 1 | PDCCH skip period for search space set 2 | PDCCH skip period for search . . . space set 3 |
|---|---|---|---|
| 0 | A1 | A2 | . . . A3 |
| 1 | B1 | B2 | . . . B3 |

In some embodiments, a PDCCH skip period is configured by DCI. For example, a field in DCI may indicate a PDCCH skip period configuration. For example, a field in a DCI is set to "1001," which means the PDCCH skipping period is nine slots. The bitwidth for this field is determined as $\log_2$(Max_period) bits, where Max_period is the maximum configurable value of PDCCH skipping period.

In another example, a field in DCI indicates a PDCCH skipping period using a bitmap, where a "0" may indicate monitoring PDCCH in the corresponding slot, and where a "1" may indicate not monitoring PDCCH in the corresponding slot. In one example, a field in DCI is set "1111111100," which indicates the PDCCH skipping period is eight slots.

In some embodiments, if the mobile station 102 is configured with a K0min or a K2 min, the PDCCH skipping period is implicit configured according to the K0min or K2 min. That is to say, the PDCCH skipping period=K0min, or PDCCH skipping period=K2 min. In some embodiments, the PDCCH skipping period is a predefined fixed value (e.g., 10). In some embodiments, the PDCCH skip period is configured associated with SCS or FR type. The mobile station 102 may be configured with more than one PDCCH skipping period candidate, one of the PDCCH skip period is indicated to apply according to at least one of a DCI, a MAC CE, or a minimum applicable scheduling offset indication.

In some embodiments, the PDCCH skipping period (skip_period) may be associated with drx-onDurationTimer. For example, skip_period may be less than or equal to drx-onDurationTimer. In another example, skip_period=A*drx-onDurationTimer, where A is greater than or equal to 1 and less than, for example, 10. In another example, skip_period=drx-onDurationTimer−B, where B is greater than 0 and less than drx-onDurationTimer.

In some embodiments, the PDCCH skipping period (skip_period) may be associated with drx-InactivityTimer. For example, skip_period may be less than drx-InactivityTimer. In another example, skip_period=A*drx-Inactivity- Timer, where A is greater than 0 and less than 1. In another example, skip_period=drx-InactivityTimer−B, where B is greater than 0 and less than drx-InactivityTimer.

In some embodiments, the PDCCH skipping period (skip_period) may be associated with a SCS. Different SCS may be associated with a same or different skip_period. A larger SCS may not be associate with a smaller skip_period then a skip_period associate with a smaller SCS.

In various examples, the PDCCH skipping period is configured per BWP, per carrier component (CC), or per UE. In various embodiments, the mobile station 102 sends to the wireless access node 104, a preferred skipping period. The wireless access node 104 may determine that the preferred skipping period is acceptable and may transmit a confirmation signal in response. The mobile station 102 may then receive from the wireless access node, a definition of the skipping period corresponding to the preferred skipping period.

Example Situations for PDCCH Monitoring Skipping

There may instances or situations wherein PDCCH monitoring skipping cannot be applied. Whether or not a mobile station 102 can apply PDCCH monitoring skipping may be determined associated with or according to a predefined information. Predefined information may be at least one of the following: DCI format, RNTI (Radio Network Temporary Identifier), search space set, CORESET (Control resource set), UE capability, TDRA (time domain resource allocation) table, high-layer configuration information, a high-layer signaling, BWP, or Cell ID.

The PDCCH monitoring skipping behavior may be specific to each UE, so the PDCCH skip may be applied at least for UE-specific DCI formats or search space sets. A mobile station may be able to perform PDCCH monitoring skipping in at least one of the following situations:

Monitoring a DCI format 0_1 and/or DCI format 1_1,
Monitoring a PDCCH with CRC scrambled by C-RNTI or CS-RNTI or MCS-C-RNTI,
Monitoring a PDCCH in at least USS (UE-specific search space),
Monitoring a PDCCH with a DCI scheduling a PDSCH when a dedicated TDRA table is applied. A dedicated TDRA table is the higher layer configured pdsch-TimeDomainAllocationList in pdsch-Config.

If a DCI or a cases is used for more than one UE (e.g., used for all the UE in one cell), the mobile stations 102 may not be able to perform the PDCCH monitoring skipping. The mobile station 102 may not be able to perform a PDCCH monitoring skipping in at least one of the following situations:

Monitoring a PDCCH with DCI format 2_0 and/or 2_1 and/or 2_6,
Monitoring a DCI with CRC scrambled by P-RNTI or SI-RNTI or RA-RNTI or TC-RNTI or
PS-RNTI or SFI-RNTI or INT-RNTI,
Monitoring a PDCCH in at least one of the following search space set: type0-PDCCH search space or a type0A-PDCCH search space or a type1-PDCCH search space or a type2-PDCCH search space or a type3-PDCCH search space,
Monitoring a PDCCH scheduling a PDSCH when a default TDRA table or a higher layer configured pdsch-TimeDomainAllocationList-ForDCIFormat1_2 is applied,
Monitoring PDCCH in a search space set provided by recoverySearchSpaceId for detection of a DCI format with CRC scrambled by C-RNTI or MCS-C-RNTI, within a window configured by BeamFailureRecoveryConfig,
Monitoring PDCCH in ra-Response Window.

In some embodiments, the mobile station 102 is configured with an indicated K0min and/or a K2 min greater than 0, wherein the mobile station 102 will continue monitoring PDCCH (does not apply the PDCCH monitoring skipping) when PDSCH transmission is scheduled with C-RNTI, CS-RNTI or MCS-C-RNTI in a common search space associated with CORESET0 and default PDSCH time domain resource allocation is used or when PDSCH transmission is scheduled with SI-RNTI or RA-RNTI.

PDCCH Monitoring Skipping Skip Used in Cross-BWP Scheduling or Cross-Carrier Scheduling In some embodiments, a cross-BWP DCI cannot indicate or trigger a PDCCH monitoring skipping. A cross-BWP DCI is a DCI that indicates a data transmission in a BWP that is not the active BWP in a serving cell. That is, a DCI with a bandwidth part indicator field that is used to indicate a bandwidth part value change. In certain approaches, if a cross-BWP DCI has a field used to indicate a PDCCH monitoring skipping, the mobile station 102 ignores the field value.

In some embodiments, a cross-BWP DCI can indicate or trigger a PDCCH monitoring skipping. The mobile station 102 may apply a PDCCH monitoring skipping after it finishes a BWP switch. In some embodiments, the mobile station 102 may apply a PDCCH monitoring skipping after it receives a PDSCH, after it transmits a PUSCH, and/or after an application delay.

If the units of application delay (X_delay) are slots, and if a cross-BWP DCI indicates or triggers a PDCCH monitoring skipping, and the SCS of a new BWP and an old BWP are not the same, the mobile station 102 may start to perform the skipping after X slots, where X is related to an application delay and a SCS. For example, $$X = X\_delay * \frac{2^{\mu NewBWP}}{2^{\mu OldBWP}},$$

where µOldBWP is numerology of an old BWP, and where µNewBWP is numerology of a new BWP.

If the units of application delay (X_delay) are slots, and if a cross-BWP DCI indicates or triggers a PDCCH monitoring skipping, and the SCS of a new BWP and an old BWP are not the same, in some embodiments, the application delay obeys the SCS before a BWP switch (or the BWP that received the DCI). In some embodiments, the application delay obeys the SCS after BWP switch (or the BWP that receives a PDSCH or transmits a PUSCH). In some embodiments, the application delay is related to a BWP switch delay (e.g., application delay is equal to a BWP switch delay). In some embodiments, the mobile station 102 does not monitor PDCCH after receive a PDSCH or transmit a PUSCH.

Cross-carrier scheduling occurs when the UE may receive a DCI in a scheduling cell and transmit or receive a data in a scheduled cell. The scheduling cell and the scheduled cell may be a same cell or different cells. In some embodiments, in cross-carrier scheduling, if the mobile station 102 receives a DCI with a field that indicates or triggers a PDCCH monitoring skipping, but that scheduled a data that is not transmitted or received on the scheduling cell, the mobile station 102 may ignore the field and continue to monitor PDCCH. If the mobile station 102 receives a DCI with a field that indicates or triggers PDCCH monitoring skipping, and that scheduled a data on the scheduling cell, the mobile station 102 may determine whether or not to monitor PDCCH on the scheduling cell based on the indication of the field in the DCI.

In some embodiments, in cross-carrier scheduling, if the mobile station 102 receives a DCI with a field that indicates or triggers PDCCH monitoring skipping, but which scheduled a data on a scheduled cell which is not the scheduling cell, the mobile station 102 may determine whether or not to monitor PDCCH of the scheduled cell on the scheduling cell based on the indication of the field in the DCI. If UE receive a DCI with a field that indicates or triggers PDCCH monitoring skipping, and which scheduled a data on the scheduling cell, the mobile station 102 may determine whether or not monitor PDCCH on scheduling cell based on the indication of the field in the DCI.

In some embodiments, in cross-carrier scheduling, if UE receive a DCI with a field that indicates or triggers PDCCH monitoring skipping, but which scheduled a data on a scheduled cell which is not the scheduling cell, the mobile station 102 may determine whether or not monitor PDCCH of the scheduled cell on scheduling cell based on the indication of the field in the DCI. If UE receive a DCI with a field that indicates or triggers PDCCH monitoring skipping, but scheduled a data on the scheduling cell, the mobile station 102 may ignore the field and continue to monitor PDCCH.

In some embodiments, in cross-carrier scheduling, if the mobile station 102 receives a DCI with a field that indicates or triggers PDCCH monitoring skipping, the mobile station 102 may determine whether or not to monitor PDCCH on scheduling cell based on the indication of the field in the DCI.

In some embodiments, in cross-carrier scheduling, the units of application delay (X_delay) are slots, and if the mobile station 102 receives a DCI with a field indicating or triggering PDCCH monitoring skipping, in some embodiments, the mobile station 102 may start to perform the skipping after X slots, where X is related to an application delay and a SCS. For example, $$X = X\_\text{delay} * \frac{2^{\mu Scheduled}}{2^{\mu Sceduling}},$$

where µScheduled is numerology of the scheduled cell, and µScheduling is numerology of the scheduling cell.

In some embodiments, in cross-carrier scheduling, where the units of application delay (X_delay) are slots, and if the mobile station receives a DCI with a field indicating or triggering PDCCH monitoring skipping. In some embodiments, the application delay obeys the SCS of the scheduling cell. In some embodiments, the application delay obeys the SCS of the scheduled cell.

In some embodiments, in cross-carrier scheduling, if the mobile station 102 receives a DCI with a field indicating or triggering PDCCH monitoring skipping, the application delay may be related to at least one of the following: a delta, a fixed value, K0min, or Zµ. In this instance, the units may be milliseconds or slots.

For the cases that the search space of scheduling cell and scheduled cell are a same search space, if the mobile station 102 receives a DCI with a field indicating or triggering a PDCCH monitoring skipping, in some embodiments, the mobile station 102 determines whether or not to monitor PDCCH on the scheduling cell based on the indication of the field in the DCI. In some embodiments, the mobile station 102 ignores the field.

Other Settings

In some embodiments, if a mobile station 102 is triggered to perform PDCCH monitoring skipping, the mobile station 102 does not monitor PDCCH for a full PDCCH monitoring duration within a PDCCH skip period. That is, the mobile station 102 will continue monitor PDCCH in a PDCCH monitoring duration if part of the PDCCH monitoring duration is outside the PDCCH skip period.

In some embodiments, if a PDCCH monitoring occasion for DCI format 2_0 is within a PDCCH skip period, it will be considered as do not detect a DCI format 2_0 at that PDCCH monitoring occasion by UE.

In some embodiments, if PDCCH monitoring occasion(s) are within a PDCCH skipping period, the PDCCH monitoring occasion(s) will be set to invalid PDCCH monitoring occasion(s). And the mobile station will not monitor a PDCCH in an invalid PDCCH monitoring occasion(s).

In various embodiments, as illustrated in FIG. 1, the mobile station 102 includes a processor 110 and a memory 112, wherein the processor 110 is configured to read computer code from the memory 112 to implement any of the methods and embodiments disclosed above relating to operations of the mobile station 102. Similarly, the wireless access node 104 includes a processor 120 and a memory 122, wherein the processor 120 is configured to read computer code from the memory 122 to implement any of the methods and embodiments disclosed above relating to operations of the wireless access node 104. Also, in various embodiments, a computer program product includes a non-transitory computer-readable program medium (e.g., memory 112 or 122) with computer code stored thereupon. The computer code, when executed by a processor (e.g., processor 110 or 120), causes the processor to implement a method corresponding to any of the embodiments disclosed above.

In accordance with the various methods and embodiments disclosed above, various technical advantages are realized. Primarily, additional power savings are achieved by reducing the amount of time the mobile station 102 is required to monitor the PDCCH.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method performed by a mobile station, the method comprising:
receiving, by the mobile station, a predefined signaling and a high-layer signaling from a wireless access node, wherein the high-layer signaling comprises a radio resource control (RRC) that configures at least one Physical Downlink Control Channel (PDCCH) skipping period candidate;
determining, by the mobile station, whether to perform PDCCH monitoring skipping according to the predefined signaling, wherein the predefined signaling indicates an index of a skipping period of a duration of a first number of slots;
performing, by the mobile station, the PDCCH monitoring skipping after one slot after receiving the predefined signaling;
not performing, by the mobile station, the PDCCH monitoring skipping in an ra-Response Window; and
stopping, by the mobile station, the PDCCH monitoring skipping in response to one or more of: a timer-based bandwidth part (BWP) switch, or the mobile station entering a DRX off mode.

2. The method according to claim 1, wherein the predefined signaling comprises a Downlink Control Information (DCI) instructing the mobile station to perform the PDCCH monitoring skipping.

3. The method according to claim 2, wherein the DCI includes an information field comprising at least one of an-the index of the skipping period or a definition of the duration of the first number of slots of the skipping period.

4. The method according to claim 1, wherein the predefined signaling comprises at least one of a Bandwidth Part (BWP), a maximum MIMO layer, a Frequency Range (FR) type, a mobile station type, a high-layer signaling, or a mobile station capability.

5. The method according to claim 1, further comprising:
after skipping monitoring of the PDCCH for the skipping period:
resuming monitoring, by the mobile station, the PDCCH for a monitoring period of a duration of a second number of slots; and
repeating a cycle of the skipping and the monitoring.

6. The method according to claim 1, further comprising:
receiving, by the mobile station, at least one of a Downlink (DL) assignment, an Uplink (UL) grant, a PDCCH indicating a new transmission, a Medium Access Control (MAC) Control Element (CE) that indicates to stop PDCCH monitoring skipping, or a Radio Resource Control (RRC) signaling configuring a parameter of the PDCCH skipping; and
responsively ending the PDCCH monitoring skipping.

7. The method according to claim 1, wherein the skipping period corresponds to at least one of an integer multiple of a periodicity of a search space set or a default number of slots.

8. The method according to claim 1, wherein performing the PDCCH monitoring skipping further comprises:
waiting an application delay prior to initiating the skipping of the monitoring of PDCCH for the skipping period, the application delay comprising a second number of slots.

9. The method according to claim 8, wherein the application delay is determined based on at least one of:
an application delay of a minimum scheduling offset restriction,
a minimum applicable scheduling offset,
a subcarrier spacing (SCS),
a Frequency Range (FR) type,
a value (Zµ) associated with the SCS,
K0,
K2,
a Physical Downlink Shared Channel (PDSCH) processing procedure time,
a Bandwidth Part (BWP),
the skipping period,
a Radio Resource Control (RRC) signal, or
a fixed value.

10. The method according to claim 1, wherein the skipping period is subject to a maximum configurable skipping period, the maximum configurable skipping period corresponding to at least one of a Discontinuous Reception (DRX) mode on duration timer, a DRX inactivity timer, a Bandwidth Part (BWP) inactivity timer, an SCell deactivation timer, a subcarrier spacing (SCS), a periodicity (ks) of a search space set, a monitoring duration (Ts) of the search space set, or a fixed value.

11. The method according to claim 1, further comprising:
sending, by the mobile station to a wireless access node, a preferred skipping period for the PDCCH monitoring skipping; and
receiving, by the mobile station from the wireless access node, a definition of the skipping period corresponding to the preferred skipping period.

12. The method according to claim 1, wherein the PDCCH monitoring skipping is performed when the mobile station is in a Discontinuous Reception (DRX) active time.

13. A mobile station comprising a processor and a memory, wherein the processor is configured to read computer code from the memory to implement the method of claim 1.

14. The method according to claim 1, wherein in response to the timer-based BWP switch, monitoring the PDCCH is performed by the mobile station if the mobile station is in a PDCCH skipping period and is not monitoring PDCCH.

15. A method of communicating between a wireless access node and a mobile station, the method comprising:
determining, by a wireless access node, indication information comprises a high-layer signaling and a predefined signaling, wherein the indication information indicates whether a mobile station is to perform a Physical Downlink Control Channel (PDCCH) monitoring, wherein the high-layer signaling comprises a radio resource control (RRC) that configures at least one PDCCH skipping period candidate, and wherein the predefined signaling indicates an index of a PDCCH skipping period to use; and
transmitting, by the wireless access node to the mobile station, the indication information, wherein the mobile station is caused to perform the PDCCH monitoring skipping after one slot after receiving the predefined signaling, wherein the mobile station is caused to not perform the PDCCH monitoring skipping in an ra-ResponseWindow, and wherein the mobile station is caused to stop the PDCCH monitoring skipping in response to one or more of: a timer-based bandwidth part (BWP) switch, or the mobile station entering a discontinuous reception (DRX) off mode.

16. The method according to claim 15, wherein the indication information is included in a Downlink Control Information (DCI) with an information field comprising at least one of the index of the skipping period or a definition of a duration of a first number of slots of the skipping period.

17. The method according to claim 15, wherein the predefined signaling comprises at least one of a Bandwidth Part (BWP), a maximum MIMO layer, a Frequency Range (FR) type, or a mobile station type, a high-layer signaling or a mobile station capability.

18. The method according to claim 15, further comprising:
determining, by the wireless access node, a timer value, expiration of which triggers the mobile station to perform the PDCCH monitoring skipping; and
transmitting, by the wireless access node to the mobile station, the timer value.

19. The method according to claim 15, wherein the PDCCH monitoring skipping period is subject to a maximum configurable skipping period, the maximum configurable skipping period corresponding to at least one of a Discontinuous Reception (DRX) mode on duration timer, a DRX inactivity timer, a Bandwidth Part (BWP) inactivity timer, an SCell deactivation timer, a subcarrier spacing (SCS), a periodicity (ks) of a search space set corresponding to assigned monitoring slots, a monitoring duration (Ts) of the search space set, or a fixed value.

20. A wireless access node comprising a processor and a memory, wherein the processor is configured to read computer code from the memory to implement the method of claim 15.

21. The method according to claim 15, wherein based on the mobile station entering a Discontinuous Reception (DRX) active time, the indication information further comprises at least one of: an indication for a mobile station to perform the PDCCH monitoring skipping, an index of a PDCCH monitoring skipping period, or a definition of a PDCCH monitoring skipping period.

* * * * *